HIGH SPEED PERFORATOR

Filed April 3, 1962 3 Sheets-Sheet 1

LEO ROSEN,
INVENTOR,
By Henry B. Stauffer
HIS ATTORNEY

May 4, 1965 L. ROSEN 3,181,783

HIGH SPEED PERFORATOR

Filed April 3, 1962 3 Sheets-Sheet 2

LEO ROSEN, INVENTOR,

By Henry B. Stauffer

HIS ATTORNEY

May 4, 1965 L. ROSEN 3,181,783

HIGH SPEED PERFORATOR

Filed April 3, 1962 3 Sheets-Sheet 3

LEO ROSEN,
INVENTOR,

By Henry B Stauffer
HIS ATTORNEY 3,181,783

HIGH SPEED PERFORATOR

Leo Rosen, 9414 St. Andrews Way, Silver Spring, Md.

Filed Apr. 3, 1962, Ser. No. 184,899
13 Claims. (Cl. 234—119)

This invention is in tape punching apparatus, and, particularly, is a high speed punch for perforating indicia bearing tapes such as printing telegraph tapes.

As is well known, printing telegraph machines and many data processing equipments utilize information presented on paper tapes by means of successive permutations of perforations. The successions are arranged longitudinally of the tapes; the permutations are customarily arranged transversely. Any number of transverse positions may be provided (five and seven element codes are familiar examples), and the information is entered on the tapes by punching or not punching in the various positions.

Except for possibly a test procedure, it is uncommon for all the punch pins to operate successively in unison, a new selection thereof being made each time a tape is stepped, or, in other words, for each punching cycle. It is principally this fact which presents difficulty in high speed punching; and prior art mechanisms in general have approached it by maintaining themselves in full speed operation (except for the punch pins themselves) even when no input signals are being received.

The present invention employs, in a general way, the same concept, but, whereas most known machines are heavy and complex and embody many reciprocating parts, my perforator is simple and includes no parts which are kept in continuous reciprocating motion.

It is a principal object of the invention to provide a high speed tape perforator employing a very small number of moving parts.

It is another object to provide a tape punching mechanism wherein, except during an actual punching step, no parts are maintained in reciprocatory motion.

An additional object of the invention is to provide a tape puncher wherein a single part is maintained in rotatory motion during so-called idling condition.

It is also an object of the invention to provide a tape feeding device embodying many of the features and concepts of the punching apparatus already mentioned.

Further and more specific objects of the invention will be apparent from a reading of the following specification and claims.

In the drawings, all of which are somewhat diagrammatic:

Figure 1:
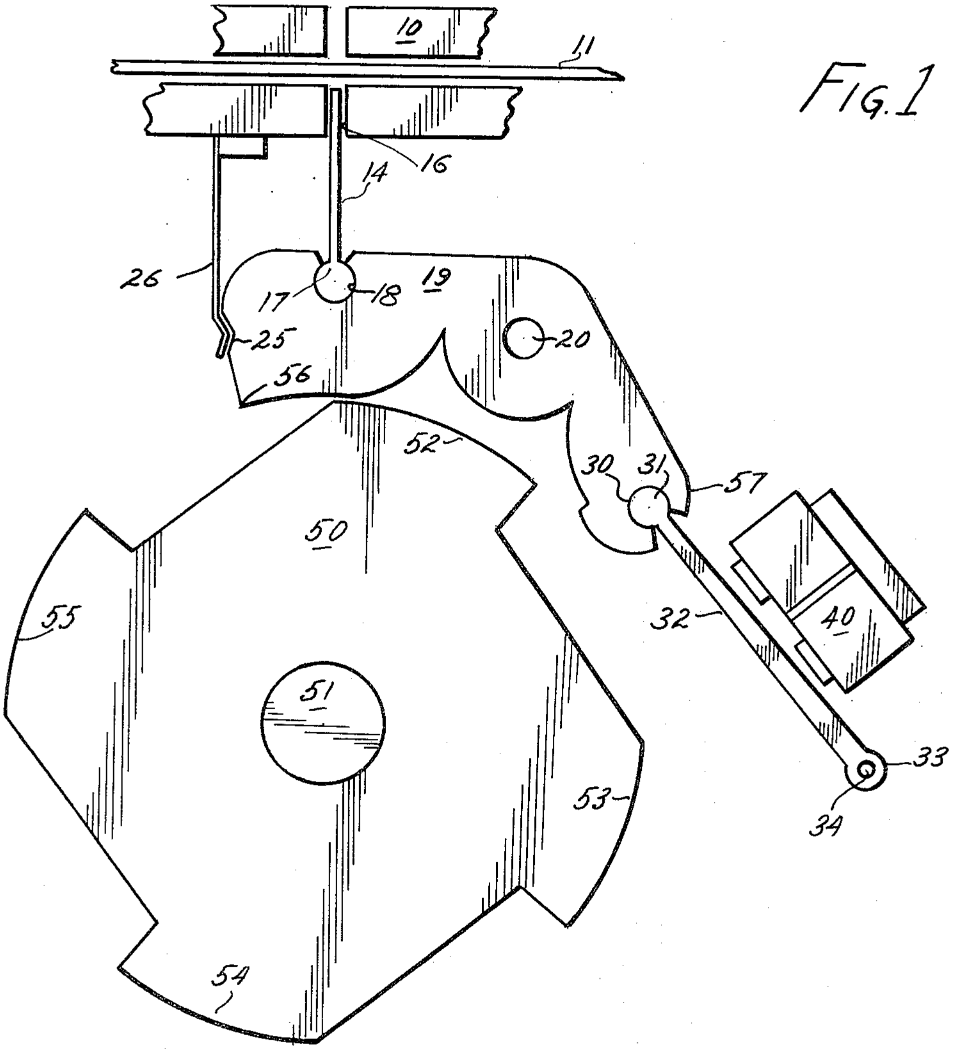
FIGURE 1 is an illustration of the principal features of the tape punch of my invention.

Considering now the drawings and especially FIGURE 1 thereof, 10 represents a die block and 11 is a paper tape into which is intended to be entered information represented by perforations in appropriate positions or areas. Neither tape feed nor the direction of tape travel is material to this description.

One punch pin 14 is shown, and this appears (in FIGURE 1) in its idling position wherein, it will be seen that its upper extremity is normally maintained just slightly below tape 11. In conventional structures, there should be understood to be additional punch pins arranged side by side transversely of the tape to be punched. Each such pin moves through a guide, as 16, and, whereas, in the drawing, considerable clearance therein appears, actual clearance in this respect (and in others) should be understood to be in accordance with good practice as known in the art.

Pin 14 terminates at its lower end in a disc 17 which is fitted into a matching opening 18 in a lifter 19 which is mounted for movement about a shaft 20 which is, itself, mounted in any convenient structure (not shown). In the left end portion of lifter 19 is provided a notch 25 and this cooperates with the V-shaped portion of a spring 26 to hold the parts in the positions illustrated during idling. The upper portion of spring 26 is shown secured to die block 10. The spring itself and the mounting therefor obviously are representative only.

The right end of lifter 19 is provided with a socket 30, and into this is fitted the disc-like terminus 31 of an armature 32, the other end, 33, of which is mounted for rotation on a pin 34, the pin in turn being secured in any convenient structure (not shown).

Electromagnet 40 is constructed and adapted to pull armature 32 toward itself when energized from a source of current (not shown).

Cam 50 is mounted in cooperating relation with lifter 19 and is, in the embodiment shown, intended for counterclockwise rotation. It, alone, of the mechanism so far described, is intended for continuous movement, and it is, in fact, the only continuously moving element.

Shaft 51, with which cam 50 rotates, is shown as having no function otherwise. Actually, it may provide many functions in addition to that illustrated. It may, in fact, be construed as the main power shaft of any prior art machine of substantially conventional organization in the field to which this invention pertains, examples being the shaft 19 of the patent to Zenner, No. 2,924,452, the shaft 13 of the patent to De Boo, No. 2,938,583, and the shaft 6 of the patent to MacNeill et al., No. 2,940,521.

Cam 50 will be described only in relation to the parts shown in the drawings. It should be understood, however, that it will normally be axially elongated, and will cooperate with adjacent lifters (not shown) to actuate other punch pins; in other words, whereas a single cam can be employed, the remaining elements of the punching mechanism must be repeated to the maximum number of perforations which may be simultaneously punched.

Figure 2:
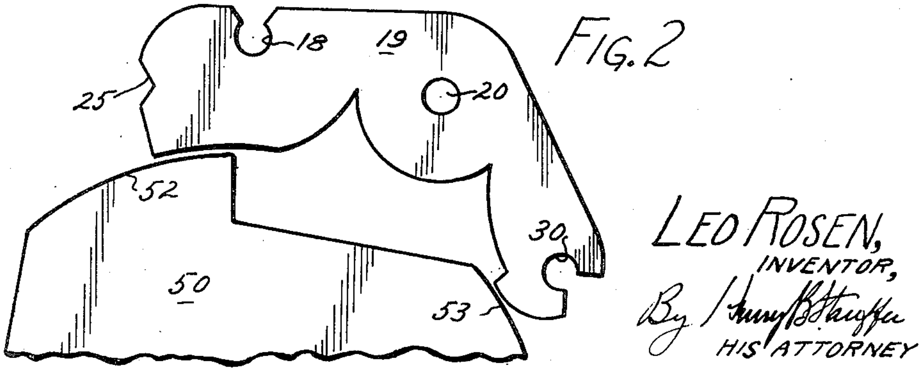
FIGURES 2 through 7 illustrate the changing conditions of certain of the elements of the invention during an operation (that is, a punching cycle)

Referring now more in detail to FIGURE 1, it will be seen that with the mechanism in its idling condition, the lobes 52, 53, 54, and 55 of cam 50 will clear, but barely, the left end lower surface 56 of lifter 19, and, from FIGURE 2, wherein cam 50 has progressed slightly, that its lobes will likewise just clear the right end lower surface 57 of the lifter.

Figures 3, 4, 5:
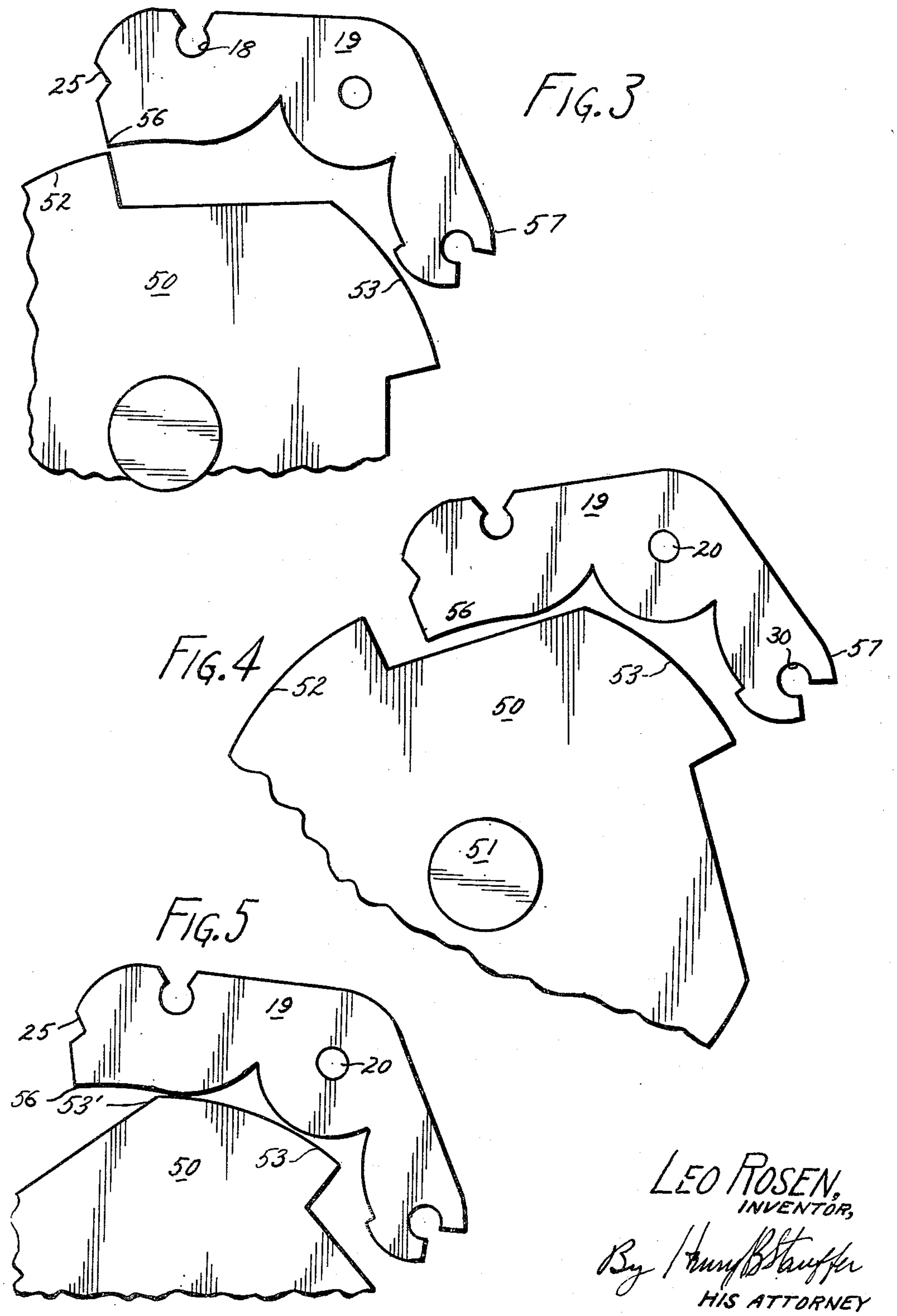

In FIGURE 3, the trailing extremity of lobe 52 has reached the leftmost portion 56 of lifter 19, and it is at approximately this point that a punching impulse should be introduced if a hole is, in fact, to be punched. This would be accomplished by closing the circuit including electromagnet 40 and the power source (not shown), While the means for closing the circuit may be envisioned as a manually-operated switch, high speed operation obviously will require mechanical or electronic switching.

The term "approximately" was used just above to describe the timing of the punching impulse because, as is well known in the art, exact timing must take into account factors such as the speed of the cam, the masses of the parts to be moved, and the build-up time of the winding. In high-speed operation of telegraphic equipment, it is common practice to provide actuating impulses which precede or "lead" the conditions under which the impulses are to become effective.

If, under the circumstances of FIGURE 3, winding 40 is energized, armature 32 will be pulled to the right, its lower end 33 turning on pivot 34, and its upper end 31, moving in socket 30, will lift the right end 57 of lifter 19, at the same time depressing the left end 56 thereof (see FIGURE 4), the slight restraining action of detent 25–26 being easily overcome.

Reference once more to FIGURE 1 will show that the action just described will also have the effect of withdrawing punch pin 14 downwardly in its guide 16 with a slight accommodating rotation of disc 17 in its socket 18.

Figures 6, 7, 8:
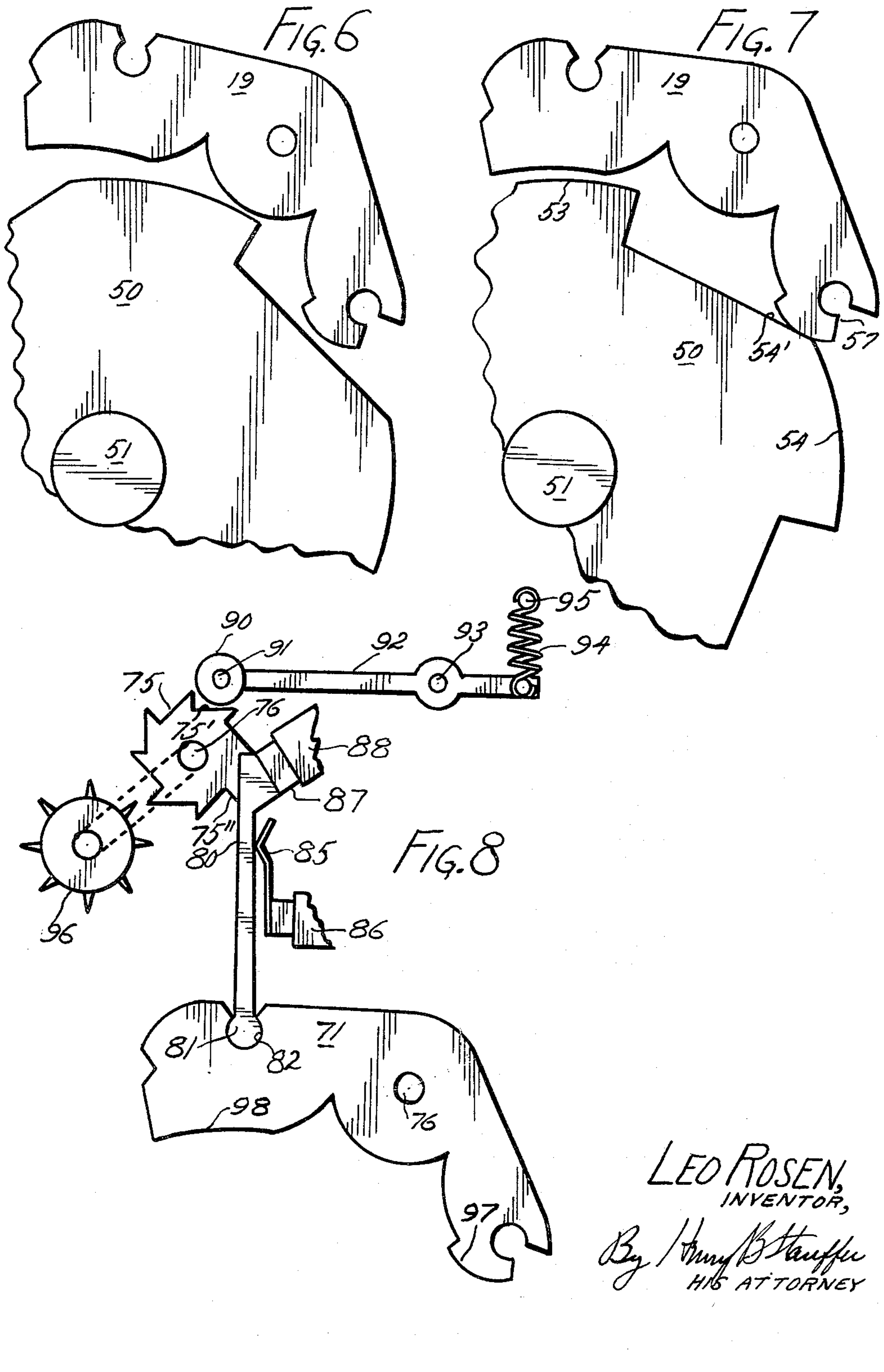
FIGURE 8 is a showing of a tape feeding mechanism according to my invention.

In FIGURE 5, the parts are shown just after the leading edge 53' of cam lobe 53 has struck lifter portion 56, and thrust it upwardly. The action imparts considerable velocity to lifter 19, and the parts reach maximum conditions approximately as shown in FIGURE 6, during which punching is accomplished, whereupon the leading edge 54' of lobe 54 engages right end portion 57 of the lifter and returns the lifter to its inoperative position and notch 25 to spring 26, cam lobe 53 and lifter portion 56 also cooperating in the "settling" of the lifter.

No mention has been made of the expiration of the punching impulse. Its duration is subject to approximately the same considerations referred to above in connection with its initiation. A review of the drawings will show that an impulse will serve no useful purpose after the parts have reached the conditions shown in FIGURE 4; the circuit including winding 40 should, therefore, be opened somewhat before this point in time.

Applicant is aware that FIGURE 1 illustrates a theoretically imperfect mechanical arrangement in that, if pivots 20 and 34 are fixed absolutely, and if there is no play whatever in disc and socket joint 30–31, the entire mechanism (excluding cam 50) is immovable. Actually, the extents of movement of the several parts in operation are small, and enough play will normally exist in a joint such as 30–31 to permit the system to operate freely. It is within the spirit of this invention, however, to employ sliding pivots, an extensible or otherwise longitudinally movable armature, and other well known mechanical expedients should they seem desirable. Similarly, it will be seen that, in the construction of FIGURE 1, punch pin 14 may be required to flex as it moves through a punching cycle, especially if the clearance in guide 16 is small. Again, this is believed not to be objectionable; but should it be found to be so, means well known (as additional pivots and guides) are available for providing true vertical movement of the upper portion of the pin.

A tape feeding mechanism embodying many of the features described above is to be seen in FIGURE 8; the electromagnet, its mounting, and its connection to the lifter are identical with those in FIGURE 1, and are not included in FIGURE 8. Certain other parts likewise are identical in structure and operation with those earlier described, and do not appear in FIGURE 8.

A ratchet 75 is mounted above the left end of lifter 71 for rotation with a shaft 76 which is itself mounted in any convenient structure (not shown). Pawl 80, the lower disc-like end 81 of which is mounted in a matching socket 82 in lifter 71, is pressed against ratchet 75 by means of spring 85 secured in any desired fashion to structure 86. Upward movement of the pawl is limited by stop 87, secured in any nearby convenient structure 88.

Resting in one of the notches, 75', of ratchet 75, is a roller 90, mounted on a pin 91, itself carried by a lever 92 pivoted at 93. The right end of lever 92 is pulled upwardly by spring 94, secured to pin 95 which is mounted in any structure (not shown), thus to press roller 90 against the ratchet. This is a familiar expedient for preventing overrun or other accidental displacement of the ratchet.

Secured to shaft 76 is a tape sprocket 96. While a direct drive is indicated for the sprocket, it is realized that in certain circumstances intermediate gearing may be desirable; the insertion of such gearing is well within the capabilities of those skilled in the art.

Operation of the tape feed is thought to be fairly apparent in view of the foregoing. In FIGURE 8, the parts are shown at the end of a feed stroke; the feed cycle will be completed by the restoration of lifter 71 to its rest or idle condition (see FIGURE 1) by the successive cooperation of surfaces 97 and 98 with successive cam lobes. In rest condition, pawl 80 will be positioned about half way down a cooperating ratchet tooth. Initiation of the succeeding feed cycle will depress the left end of lifter 71, and bring the top-most extremity of pawl 80 below tooth 75'', whereupon operation will continue in obvious fashion.

As was above indicated, the cam intended for cooperation with lifter 71 is, or may be, identical with cam 50. should it be desired to employ the novel punching mechanism and the novel tape feed hereof in a single machine, two expedients will suggest themselves, it being recalled that feeding and punching can not be accomplished simultaneously, but must be successive: either two cams, relatively disoriented, may be used, or a single cam with the punch-operating lifters disoriented from the feed-operating lifter may be employed. Proper timing of operating pulses for the two operations will be obvious to those skilled in the art, many expedients being known, the preference of the inventor being for a variable reluctance or photo-sensitive pickup to minimize wear and insure reliability.

It will be noticed that cam 50 is provided with four lobes, and it has been indicated that the cam employed with the device of FIGURE 8 may be identical. It will be seen, also, that the lifters shown span adjacent lobes of the cam. Neither of these features is of the essence of the invention.

For the true scope of the invention, reference should be had to the appended claims.

I claim:

1. In a device of the character described, a rotatable cam having a plurality of radially extending lobes and relatively depressed peripheral areas therebetween, a lifter pivoted in cooperable relation to said cam said lifter having end portions extending from said pivot said end portions having surfaces normally held adjacent the radial extremities of said cam lobes, means operable in timed relation with the rotation of said cam for turning said lifter on its pivot thereby to depress one of said end portions into a said depressed peripheral area the striking of said last mentioned end portion by the succeeding said lobe being effective to thrust said last mentioned end portion outwardly from said cam and simultaneously depress the other of said end portions into a said depressed peripheral area the striking of said other of said end portions by the following said lobe being effective to urge the said surfaces of said end portions of said lifter toward their normal positions.

2. The invention of claim 1, further characterized by a punch mounted in the said one end of said lifter.

3. The invention of claim 1, further characterized by a punch mounted for pivotal movement in the said one end of said lifter.

4. The invention of claim 1, further characterized by a pawl mounted in the said one end of said lifter.

5. The invention of claim 1, further characterized by a pawl mounted for pivotal movement in the said one end of said lifter.

6. The invention of claim 1, further characterized in that said means for turning said lifter on its pivot includes an electromagnet and an armature pivotally cooperating with said lifter.

7. In a device of the character described, a rotatable cam having a plurality of radially extending lobes, a lifter mounted for movement about an axis in cooperable relation to said cam said lifter having end portions extending from said axis said end portions having surfaces normally adjacent the radial extremities of said cam lobes, a punch pivotally mounted in one end of said lifter, a guide for said punch, a support for a medium to be punched, said punch normally being supported by said lifter adjacent said medium support, electromagnetic means operable in timed relation with said cam for moving said one end of said lifter into the path of a said lobe collision of the parts urging said one end of said lifter outwardly from said cam and said punch beyond its said normal support position, and means including said lobes and the said ends of said lifter for restoring said ends to their normal condition.

8. In a device of the character described, a rotatable cam having a plurality of radially extending lobes, a lifter mounted for movement about an axis in cooperable relation to said cam said lifter having end portions extending from said axis said end portions having surfaces normally adjacent the radial extremities of said cam lobes, a pawl pivotally mounted in one end of said lifter, a ratchet, means for supporting said pawl in cooperating relation with said ratchet, a sprocket mounted for rotation responsive to movement of said ratchet, electromagnetic means operable in timed relation with said cam for moving said one end of said lifter into the path of a said lobe collision of the parts urging said one end of said lifter outwardly from said cam and said pawl against a tooth of said ratchet, and means including said lobes and the said ends of said lifter for restoring said ends to their normal condition.

9. A device of the character described, including a cam having at least one radially extending lobe portion with a leading edge and a trailing edge and a relatively depressed peripheral portion, means for rotating said cam, a lifter mounted for movement about a pivot, said lifter having a forward end portion and a rearward end portion, detent means for disposing said lifter normally spaced from said lobe portion, means operable substantially as the trailing edge of a said lobe portion passes beyond said forward end of said lifter for urging said forward end into the path of a said leading edge of a said lobe portion the striking of said forward end by a said leading edge urging said forward end outwardly from said cam and urging said rearward end of said lifter into the path of a said leading edge of a following said lobe portion the striking thereof by a said leading edge urging said lifter toward its said normal disposition, and a punch mounted in said forward end portion of said lifter.

10. The invention of claim 9, further characterised in that said punch is mounted for pivotal movement in said forward end portion of said lifter.

11. A device of the character described, including a cam having at least one radially extending lobe portion with a leading edge and a trailing edge and a relatively depressed peripheral portion, means for rotating said cam, a lifter mounted for movement about a pivot said lifter having a forward end portion and a rearward end portion, detent means for disposing said lifter normally spaced from said lobe portion, means operable substantially as the trailing edge of a said lobe portion passes beyond said forward end of said lifter for urging said forward end into the path of a said leading edge of a said lobe portion the striking of said forward end by a said leading edge urging said forward end outwardly from said cam and urging said rearward end of said lifter into the path of a said leading edge of a following said lobe portion the striking thereof by a said leading edge urging said lifter toward its said normal disposition, and a pawl mounted in said forward end portion of said lifter.

12. The invention of claim 11, further characterised in that said pawl is mounted for pivotal movement in said forward end portion of said lifter.

13. A device of the character described, including a cam having at least one radially extending lobe portion with a leading edge and a trailing edge and a relatively depressed peripheral portion, means for rotating said cam, a lifter mounted for movement about a pivot said lifter having a forward end portion and a rearward end portion, a detent means for disposing said lifter normally spaced from said lobe portion, means operable substantially as the trailing edge of a said lobe portion passes beyond said forward end of said lifter for urging said forward end into the path of a said leading edge of a said lobe portion the striking of said forward end by a said leading edge urging said forward end outwardly from said cam and urging said rearward end of said lifter into the path of a said leading edge of a following said lobe portion the striking thereof by a said leading edge urging said lifter toward its said normal disposition, said means for urging said forward end of said lifter into the path of a said leading edge of a said lobe portion including an electromagnet and an armature pivotally cooperating with said lifter.

References Cited by the Examiner

UNITED STATES PATENTS

| | | | |
|---|---|---|---|
| 1,804,090 | 5/31 | Crumrine | 234—119 |
| 2,845,122 | 7/58 | Lake et al. | 234—119 |

ANDREW R. JUHASZ, *Primary Examiner.*

FRANK E. BAILEY, JOHN C. CHRISTIE, *Examiners.*